(12) United States Patent
Ikemoto

(10) Patent No.: US 9,885,635 B2
(45) Date of Patent: Feb. 6, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Masato Ikemoto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 49 days.

(21) Appl. No.: 15/102,313

(22) PCT Filed: Dec. 10, 2014

(86) PCT No.: PCT/JP2014/082713
§ 371 (c)(1),
(2) Date: Jun. 7, 2016

(87) PCT Pub. No.: WO2015/093373
PCT Pub. Date: Jun. 25, 2015

(65) Prior Publication Data
US 2016/0334304 A1 Nov. 17, 2016

(30) Foreign Application Priority Data
Dec. 17, 2013 (JP) .................................. 2013-260668

(51) Int. Cl.
*G01M 15/05* (2006.01)
*G01M 15/04* (2006.01)
(Continued)

(52) U.S. Cl.
CPC ............ *G01M 15/048* (2013.01); *F01P 3/20* (2013.01); *F01P 11/16* (2013.01); *F02D 41/042* (2013.01);
(Continued)

(58) Field of Classification Search
USPC ...................................................... 73/114.45
See application file for complete search history.

(56) References Cited

U.S. PATENT DOCUMENTS 5,467,926 A * 11/1995 Idleman .................. F23D 14/02
239/132.5
6,408,801 B1 * 6/2002 Frostick .................... F01P 1/10
123/41.31
(Continued)

FOREIGN PATENT DOCUMENTS

JP 2009-2229 1/2009
JP 2010-255462 11/2010

*Primary Examiner* — Eric S McCall
(74) *Attorney, Agent, or Firm* — Finnegan, Henderson, Farabow, Garrett & Dunner, LLP

(57) ABSTRACT

A control device for an internal combustion engine that includes: a first detection unit detecting, as a first parameter, a temperature of a nozzle tip of an injector; and a second detection unit detecting, as a second parameter, a heat quantity of a cylinder head, and executes a dew condensation determination by using at least one of the first parameter and the second parameter, the control device includes: a third detection unit detecting an evaluation value allowing to evaluate a state of the internal combustion engine, a threshold value for selecting which parameter of the first and second parameters is selected being set with respect to the evaluation value, wherein the control device switches a parameter to be used to the first parameter, to the second parameter, or to both the first and second parameters in accordance with the evaluation value when executing the dew condensation determination.

7 Claims, 17 Drawing Sheets

(51) Int. Cl.
*F02D 41/04* (2006.01)
*F02M 61/18* (2006.01)
*F01P 3/20* (2006.01)
*F01P 11/16* (2006.01)

(52) U.S. Cl.
CPC ......... *F02M 61/18* (2013.01); *F01P 2025/08* (2013.01); *F02D 2200/021* (2013.01); *F02D 2200/0414* (2013.01); *F02D 2200/0418* (2013.01); *F02M 2200/05* (2013.01)

(56) References Cited

U.S. PATENT DOCUMENTS

| | | | |
|---|---|---|---|
| 2005/0056260 A1* | 3/2005 | Ellies | F02D 41/065 |
| | | | 123/478 |
| 2010/0094527 A1 | 4/2010 | Futonagane et al. | |
| 2015/0300286 A1* | 10/2015 | Ikemoto | F02D 41/22 |
| | | | 73/114.48 |
| 2015/0354475 A1* | 12/2015 | Ikemoto | F02D 35/025 |
| | | | 123/41.02 |

* cited by examiner

DETERMINATION MAP FOR DETERMINATION THRESHOLD VALUE tr

TO DETERMINATION THRESHOLD VALUE tr

BETWEEN A AND C (NEAR BOUNDARY BETWEEN OCCURRENCE AND NON-OCCURRENCE OF CORROSION)

EQUAL TO OR GREATER THAN DETERMINATION THRESHOLD VALUE Twr

CONTROL DEVICE FOR INTERNAL COMBUSTION ENGINE

CROSS-REFERENCE TO RELATED APPLICATIONS

This application is a national phase application of International Application No. PCT/JP2014/082713, filed Dec. 10, 2014, and claims the priority of Japanese Application No. 2013-260668, filed Dec. 17, 2013, the content of both of which is incorporated herein by reference.

TECHNICAL FIELD

The present invention relates to a control device for an internal combustion engine.

BACKGROUND ART

It has been conventionally known that an injection aperture located at a nozzle tip portion may corrode due to the adhesion of condensed water formed by dew condensation of water on the nozzle tip portion of an injector that injects fuel into a cylinder of an internal combustion engine. Whether dew condensation forms on the nozzle tip portion is affected by the relation between the temperature of the nozzle tip and a dew point of the atmosphere in the cylinder. From this perspective, Patent Document 1 suggests estimating the temperature of the nozzle tip and then adjusting an EGR quantity based on the estimated temperature of the nozzle tip to reduce the corrosion.

PRIOR ART DOCUMENT

Patent Document

[Patent Document 1] Japanese Patent Application Publication No. 2010-255462

SUMMARY OF THE INVENTION

Problems to be Solved by the Invention

As disclosed in above Patent Document 1, the temperature of the nozzle tip affects whether condensed water adheres to the nozzle tip portion. However, the temperature of the nozzle tip continuously decreases after shutdown of the internal combustion engine. Thus, even though the temperature of the nozzle tip at a certain time is obtained, it is difficult to correctly predict the process of how the temperature of the nozzle tip decreases thereafter and dew condensation forms. Therefore, above Patent Document 1 leaves room for improvement in determination of whether the injection aperture is to corrode due to the generation of condensed water, i.e., due to dew condensation.

On the other hand, the improvement in the accuracy of the determination of whether the injection aperture is to corrode may increase the computation load of an ECU (Electronic control unit).

The control device for an internal combustion engine disclosed in the present description aims to maintain the accuracy in the determination of whether the injection aperture located at the nozzle tip portion is to corrode and reduce the computation load in the determination.

Means for Solving the Problems

To solve the above problem, a control device for an internal combustion engine disclosed in the present description is a control device for an internal combustion engine that includes a first detection unit that detects, as a first parameter, a temperature of a nozzle tip of an injector; and a second detection unit that detects, as a second parameter, a heat quantity of a cylinder head, and executes a dew condensation determination that determines whether dew condensation occurs on the nozzle tip of the injector after shutdown of the internal combustion engine by using at least one of the first parameter and the second parameter, the control device including: a third detection unit that detects an evaluation value that allows to evaluate a state of the internal combustion engine, a threshold value for selecting which parameter of the first parameter and the second parameter is selected being set with respect to the evaluation value, wherein the control device switches a parameter to be used to the first parameter, to the second parameter, or to both the first parameter and the second parameter in accordance with the evaluation value when executing the dew condensation determination. This configuration allows the dew condensation determination and therefore a determination of whether corrosion is to occur to be executed appropriately and reduces a computation load in the execution of the determination.

More specifically, the control device for an internal combustion engine disclosed in the present description may use the second parameter as the parameter to be used for the dew condensation determination when the evaluation value is equal to or less than a first threshold value. In a case where the internal combustion engine is in a state immediately after starting, the dew condensation determination is executed with the heat quantity of the cylinder head that is the second parameter in a region where the evaluation value is equal to or less than the first threshold value and the effect of the heat quantity of the cylinder head on the occurrence of the dew condensation on the nozzle tip after shutdown of the internal combustion engine is large. The use of only one parameter reduces the computation load. In addition, when a region in which such a step is selected is limited to a region in which the accuracy of the dew condensation determination and thus the determination of whether the injection aperture is to corrode is ensured by using only the second parameter, the accuracy of the determination of whether the injection aperture is to corrode is ensured.

Additionally, the control device for an internal combustion engine disclosed in the present description may use both the first parameter and the second parameter as the parameter to be used for the dew condensation determination when the evaluation value is between a first threshold value and a second threshold value greater than the first threshold value. When the evaluation value is between the first threshold value and the second threshold value that form a boundary region between the occurrence and the non-occurrence of the corrosion of the injection aperture, both the first parameter and the second parameter are used to execute the dew condensation determination and thus the determination of whether the injection aperture is to corrode with high accuracy.

The control device for an internal combustion engine disclosed in the present description may use the first parameter as the parameter to be used for the dew condensation determination when the evaluation value is equal to or greater than a second threshold value greater than a first threshold value. When the evaluation value is equal to or greater than the second threshold value, the dew condensation determination and thus the determination of whether the injection aperture is to corrode are executed by using the temperature of the nozzle tip of the injector that is the first parameter. The use of only one parameter reduces the computation load. In addition, when a region in which such a step is selected is limited to a region in which the accuracy of the dew condensation determination and thus the determination of whether the injection aperture is to corrode is ensured by using only the first parameter, the accuracy of the dew condensation determination and thus the determination of whether the injection aperture is to corrode is ensured.

In the control device for an internal combustion engine disclosed in the present description, the evaluation value may be the temperature of the nozzle tip of the injector. Alternatively, the evaluation value may be a temperature of cooling water of the internal combustion engine. Values allowing for the evaluation of the state such as the warm-up of the internal combustion engine may be employed as the evaluation value.

In addition, in the control device for an internal combustion engine disclosed in the present description, the second detection unit may detect the heat quantity of the cylinder head as the second parameter by reflecting a heat quantity accumulated after starting of the internal combustion engine to a heat quantity of the cylinder head in the starting of the internal combustion engine. The accurate detection of the heat quantity of the cylinder head improves the accuracy in the dew condensation determination and thus the determination of whether the injection aperture is to corrode.

Effects of the Invention

The control device for an internal combustion engine disclosed in the present description maintains the accuracy in the determination of whether the injection aperture located at the nozzle tip portion is to corrode and reduces the computation load in the determination.

BRIEF DESCRIPTION OF THE DRAWINGS

FIG. 10A illustrates a base map indicating a decrease history of the temperature of the nozzle tip after shutdown of the internal combustion engine, FIG. 10B is a graph that predicts how the temperature of the nozzle tip changes with time with use of the base map based on the temperature of cooling water converted from the head heat quantity, and FIG. 10C illustrates a map used to calculate a dew point arrival time;

MODES FOR CARRYING OUT THE INVENTION

Figure 1:
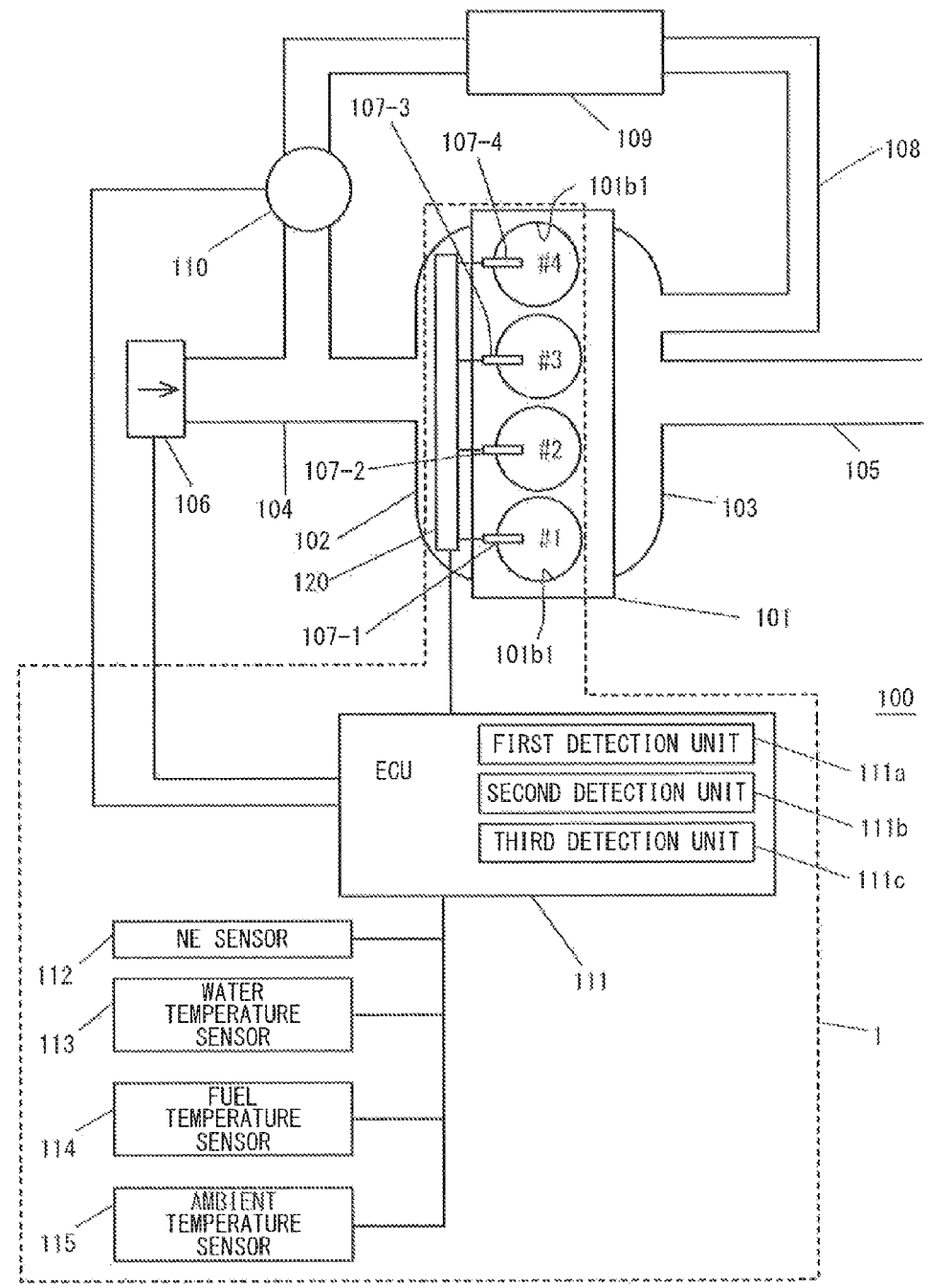
FIG. 1 is an explanatory diagram illustrating an overview configuration of an internal combustion engine of a first embodiment.

Hereinafter, embodiments of the present invention will be described with accompanying drawings. In the drawings, the dimensions of each portion, the ratio, and the like may not completely correspond to those of the actual ones. Some drawings omit the illustration of specifics.

First Embodiment

Figure 2:
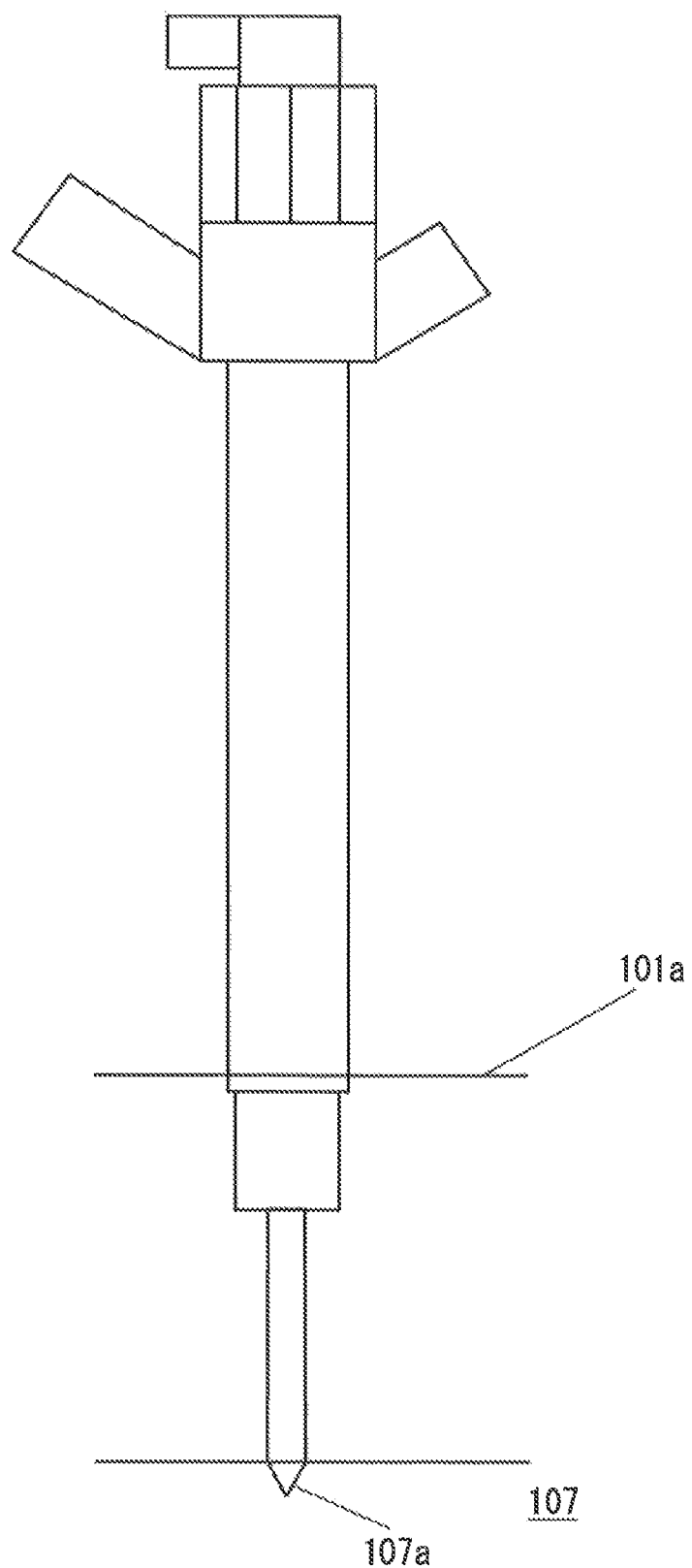
FIG. 2 is an explanatory diagram of an injector installed in the internal combustion engine.

FIG. 1 is an explanatory diagram illustrating an overview configuration of an internal combustion engine 100 of a first embodiment. FIG. 2 is an explanatory diagram of an injector 107 installed in the internal combustion engine 100. A fuel injection device 1 is installed in the internal combustion engine 100. The internal combustion engine 100 in the first embodiment is an internal combustion engine that injects fuel into cylinders, more specifically, is a diesel internal combustion engine, but may be a gasoline internal combustion engine. Although the number of the cylinders of the internal combustion engine is not limited, the internal combustion engine 100 of the present embodiment has four cylinders. The internal combustion engine 100 includes an engine body 101 including a cylinder head 101a and a cylinder block 101b, and a #1 cylinder through a #4 cylinder in the engine body 101. The fuel injection device 1 includes a #1 injector 107-1 through a #4 injector 107-4 respectively corresponding to the #1 cylinder through the #4 cylinder. More specifically, the #1 injector 107-1 is installed in the #1 cylinder, and the #2 injector 107-2 is installed in the #2 cylinder. The #3 injector 107-3 is installed in the #3 cylinder, and the #4 injector 107-4 is installed in the #4 cylinder. The #1 injector 107-1 through the #4 injector 107-4 are connected to a common rail 120, and supplied with high-pressure fuel from the common rail 120. With reference to FIG. 2, each injector 107 is installed in the cylinder head 101a. Heat is transferred between the injector 107 and the cylinder head 101a through a seat portion.

The internal combustion engine 100 includes an intake manifold 102 and an exhaust manifold 103 mounted on the engine body 101. An intake pipe 104 is connected to the intake manifold 102. An exhaust pipe 105 and a first end of an EGR passage 108 are connected to the exhaust manifold 103. A second end of the EGR passage 108 is connected to the intake pipe 104. An EGR cooler 109 is located in the EGR passage 108. An EGR valve 110 that controls the flow state of exhaust gas is located in the EGR passage 108. An air flow meter 106 is connected to the intake pipe 104. The air flow meter 106 is electrically connected to an ECU 111. Electrically connected to the ECU 111 are the injectors 107-$i$ ($i$ represents the cylinder number), more specifically, the #1 injector 107-1 through the #4 injector 107-4. The ECU 111 functions as a control device, and executes various controls described in detail later.

Electrically connected to the ECU 111 are an NE sensor 112 that measures the rotation speed of the internal combustion engine 100, a water temperature sensor 113 that measures the temperature of cooling water, a fuel temperature sensor 114 that measures the temperature of fuel, and an ambient temperature sensor 115. The ECU 111 stores maps used for various controls of the internal combustion engine 100. The ECU 111 includes a first detection unit 111$a$, a second detection unit 111$b$, and a third detection unit 111$c$. The first detection unit 111$a$ detects a temperature Tnzl of the tip of the injector 107. The second detection unit 111$b$ detects a heat quantity Q stored in the cylinder head 101$a$ (hereinafter, referred to as the head heat quantity Q). The third detection unit 111$c$ detects the temperature of the nozzle tip that is an example of an evaluation value. For the temperature of the nozzle tip detected by the third detection unit 111$c$, a threshold value for determining which parameter of a first parameter and a second parameter described later is selected is set. The temperature of the nozzle tip changes depending on the operating condition and the operating history of the internal combustion engine 100. In the present embodiment, the second detection unit 111$b$ and the third detection unit 111$c$ are separately prepared, but one of the second detection unit 111$b$ and the third detection unit 111$c$ may be implemented by complementing the function of one of them by the other one.

The first detection unit 111$a$ of the present embodiment estimates the temperature Tnzl of the nozzle tip of the injector 107 by reflecting the adjustment condition to the temperature of cooling water flowing inside the engine body 101, but may detect the temperature Tnzl of the nozzle tip with by other methods. For example, the first detection unit 111$a$ may directly detect the temperature Tnzl of the nozzle tip with a temperature sensor. The temperature Tnzl of the nozzle tip may be estimated with use of a value correlating with the temperature Tnzl of the nozzle tip.

The second detection unit 111$b$ of the present embodiment estimates the head heat quantity Q by integrating instant temperatures as a received heat from the combustion gas, but may detect the head heat quantity Q by other methods. For example, as described in a third embodiment described later, the second detection unit may directly detect the head heat quantity Q with use of a temperature change $\Delta T$ of cooling water.

The third detection unit 111$c$ of the present embodiment employs the temperature Tnzl of the nozzle tip as the evaluation value, and the ECU 111 switches the combination of parameters used for the determination of whether the injection aperture is to corrode in accordance with the detected temperature Tnzl of the nozzle tip. More specifically, the ECU 111 switches, in accordance with the temperature Tnzl of the nozzle tip obtained by the third detection unit 111$c$, a parameter to be used to the first parameter, to the second parameter, or to both the first parameter and the second parameter. Here, the first parameter in the present embodiment is the temperature Tnzl of the nozzle tip, and the second parameter is the head heat quantity Q. That is to say, the ECU 111 switches, in accordance with the temperature Tnzl of the nozzle tip, the parameter to be used to the temperature Tnzl of the nozzle tip, to the head heat quantity Q, or to both the temperature Tnzl of the nozzle tip and the head heat quantity Q when determining whether the injection aperture is to corrode. The temperature Tnzl of the nozzle tip correlates with the temperature Tw of cooling water. That is to say, the temperature Tnzl of the nozzle tip is a value that is saturated to the temperature Tw of cooling water and correlates with the temperature Tw of cooling water.

With reference to FIG. 2 illustrating the injector 107 installed in the internal combustion engine 100, the injector 107 installed in the cylinder head 101$a$ includes a nozzle 107$a$ at the tip portion thereof. An injection aperture is located in the nozzle 107$a$. When condensed water builds up condensation on and adheres to the tip portion of the nozzle 107$a$, the tip portion of the nozzle 107$a$ may corrode. When the vicinity of the injection aperture corrodes, the aperture diameter of the injection aperture may change. The change in the diameter of the injection aperture affects the proper fuel injection. Thus, the ECU 111 determines whether dew condensation is to occur. The ECU 111 executes a nozzle corrosion prevention control as necessary.

Figure 3:
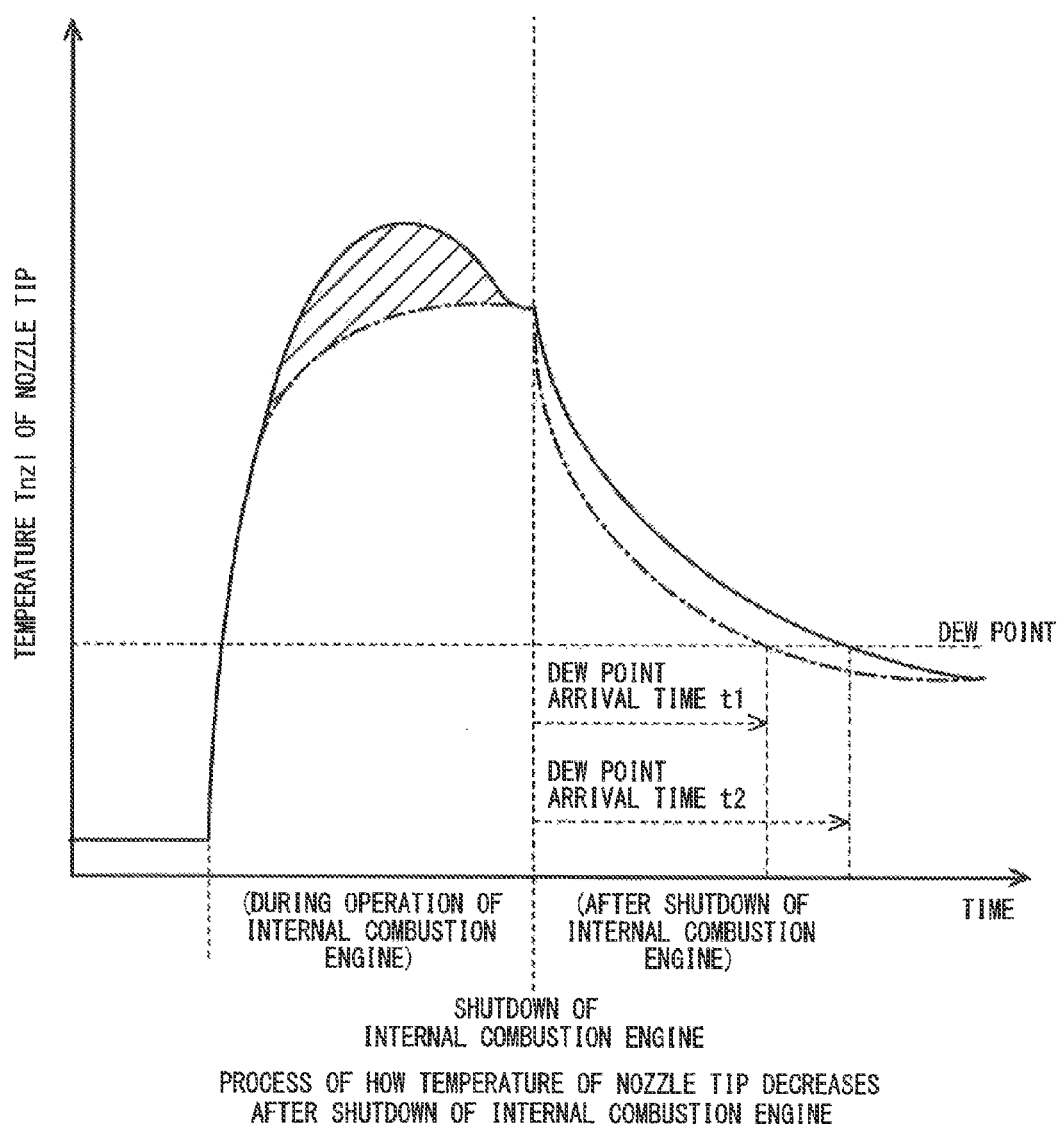
FIG. 3 is an explanatory diagram illustrating a process of how the temperature of the nozzle tip decreases after shutdown of the internal combustion engine.

Here, with reference to FIG. 3, described is a process of how the temperature Tnzl of the nozzle tip decreases after shutdown of the internal combustion engine. In FIG. 3, the solid line and the chain line represent the progression of the temperature Tnzl of the nozzle tip before and after shutdown of the internal combustion engine. The temperatures Tnzl of the nozzle tip are the same between the solid line and the chain line at the time of shutdown of the internal combustion engine. However, the decreasing rate of the temperature Tnzl of the nozzle tip after the shutdown of the internal combustion engine indicated by the solid line is more gentle and slower than the decreasing rate indicated by the chain line. Accordingly, time t2 at which the temperature Tnzl of the nozzle tip indicated by the solid line reaches a dew point is longer than time t1 at which the temperature Tnzl of the nozzle tip indicated by the chain line reaches the dew point. As the time till the temperature of the nozzle tip reaches the dew point increases, the possibility that dew condensation occurs in a part other than the nozzle tip portion increases. Thus, the longer dew point arrival time has advantages in preventing the corrosion of the nozzle. The reason why the decreasing rates of the temperature Tnzl of the nozzle tip differ even when the temperatures Tnzl of the nozzle tip are the same at the time of the shutdown of the internal combustion engine is because the head heat quantities Q before shutdown of the internal combustion engine differ. With reference to FIG. 3, the history of the temperature Tnzl of the nozzle tip differs between the solid line and the chain line. Accordingly, the received heat quantity of the cylinder head, i.e., the head heat quantity Q of the solid line is greater than that of the chain line by the quantity indicated by hatching in FIG. 3. The difference in the head heat quantity Q is considered to appear as the difference in the decreasing rate of the temperature Tnzl of the nozzle tip after shutdown of the internal combustion engine.

Figure 4:
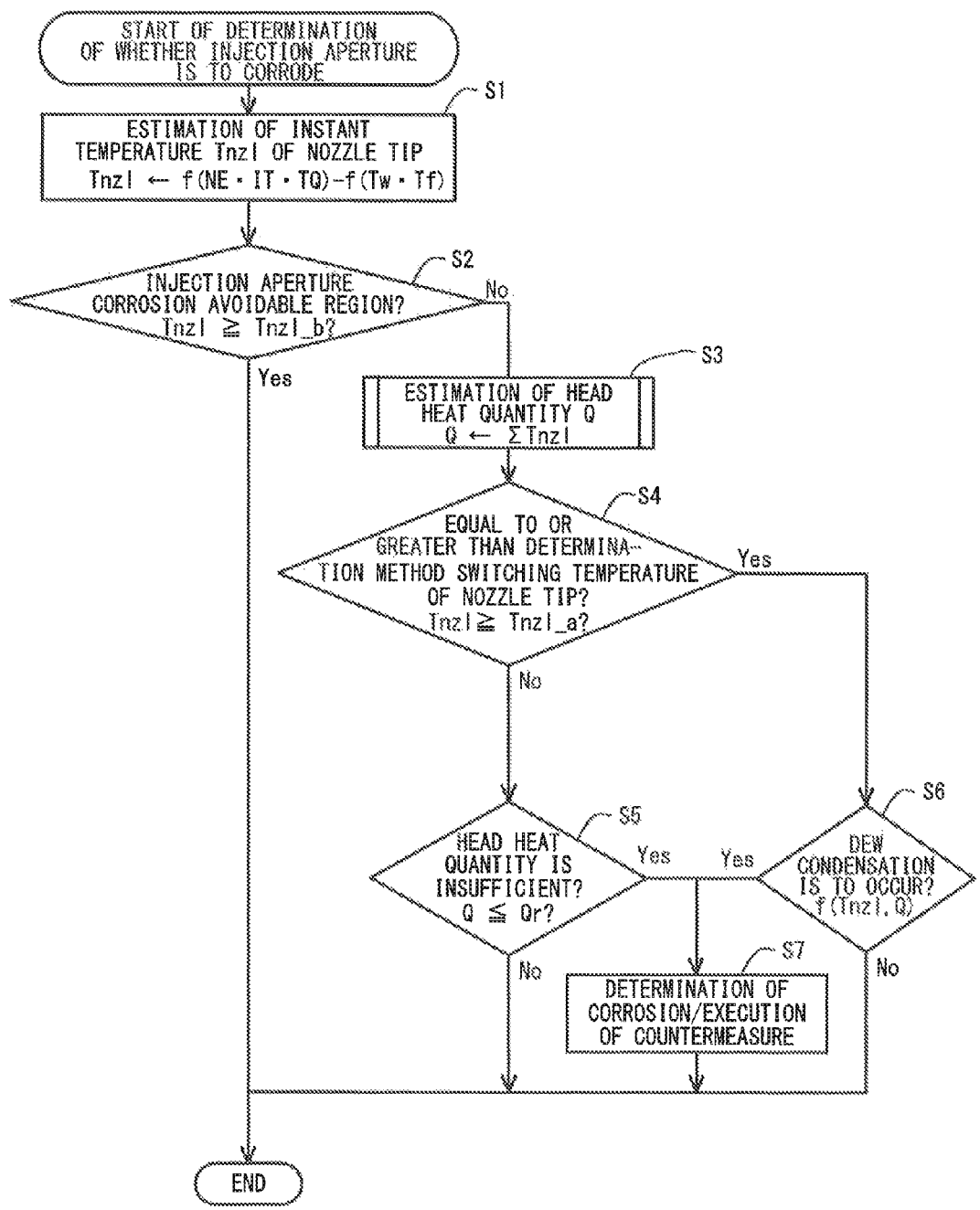
FIG. 4 is a flowchart illustrating a control of the internal combustion engine of the first embodiment.
Figure 5:
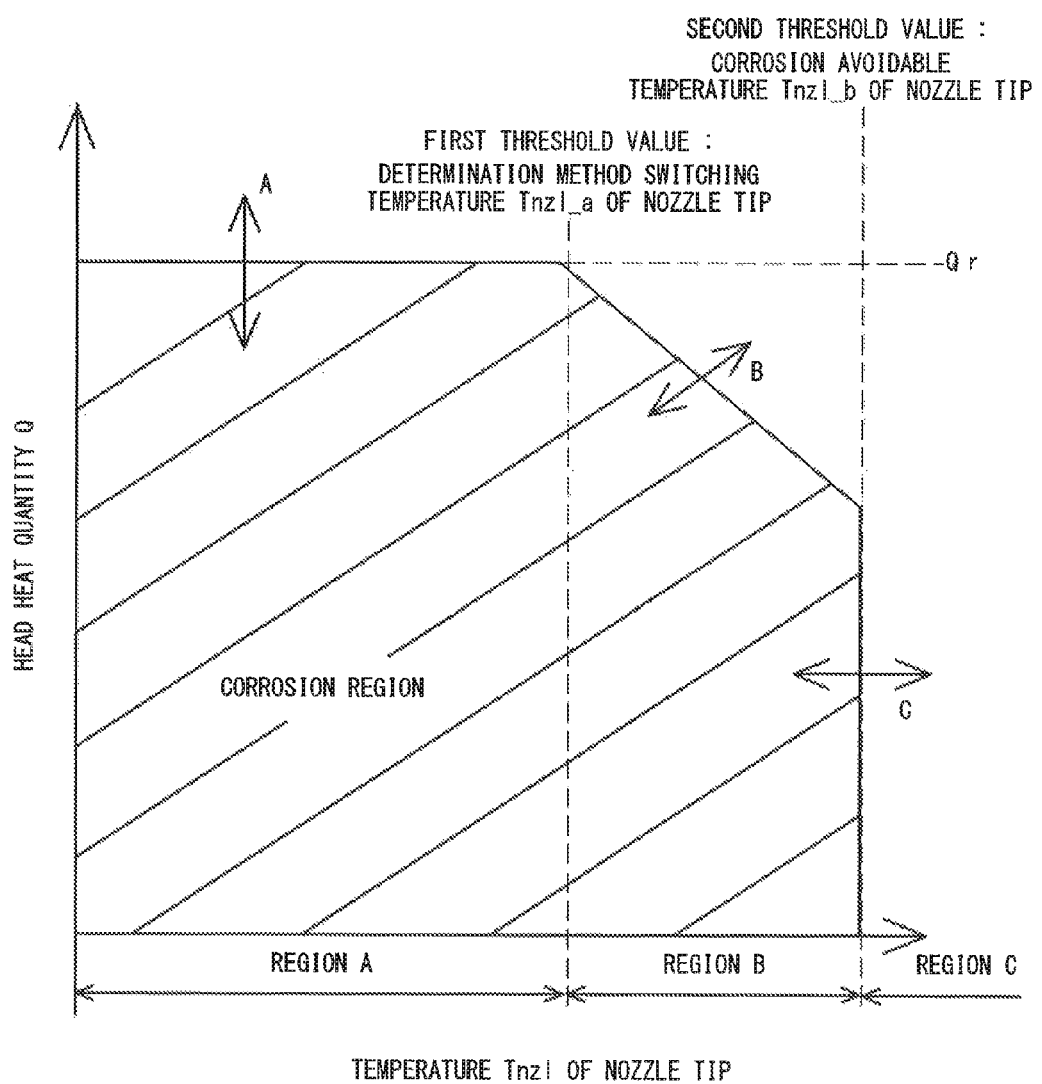
FIG. 5 illustrates a map used to determine whether dew condensation is to occur in the first embodiment.
Figure 6:
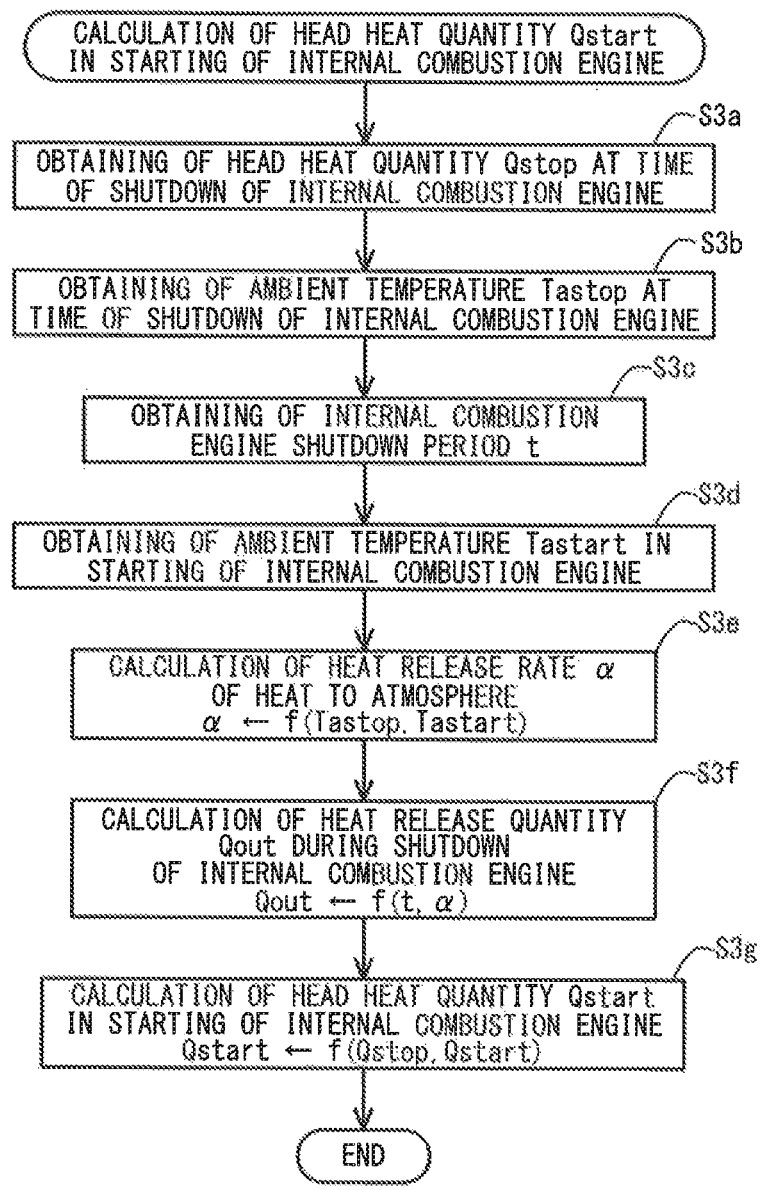
FIG. 6 is a flowchart illustrating a control that calculates a head heat quantity in starting of the internal combustion engine in the first embodiment.
Figure 7:
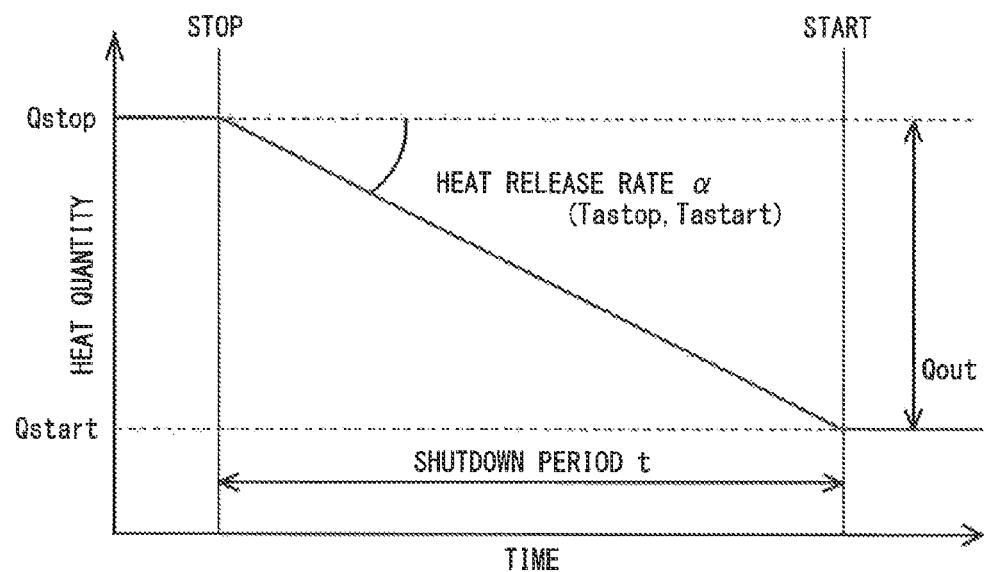
FIG. 7 is a graph illustrating a process of how the head heat quantity decreases from shutdown of the internal combustion engine till restart of the internal combustion engine.
Figure 8:
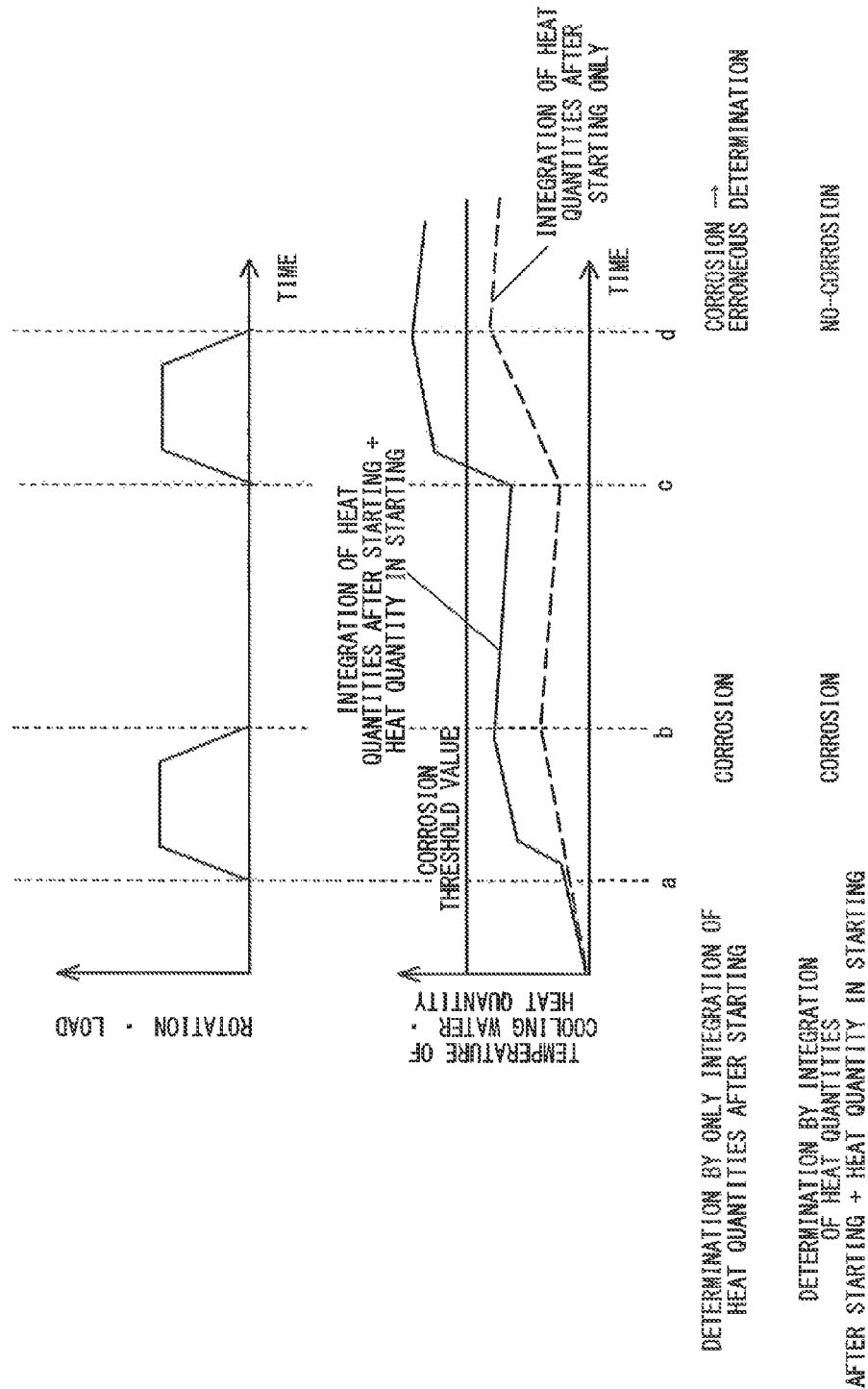
FIG. 8 is a graph illustrating a determination of whether corrosion is to occur that reflects on the head heat quantity in starting of the internal combustion engine.
Figure 9A:
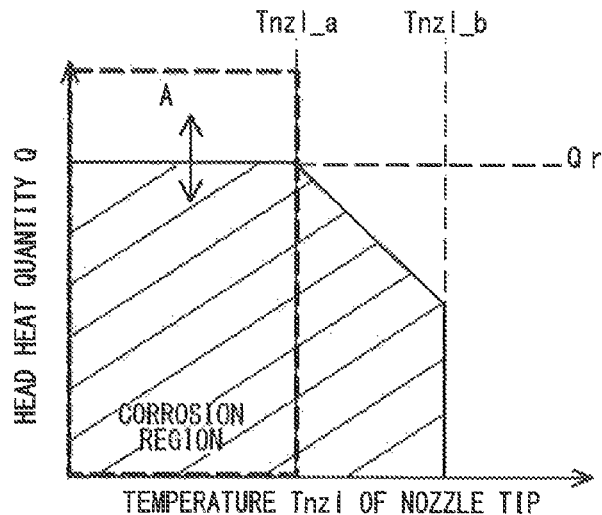
FIG. 9A, FIG. 9B, and FIG. 9C are explanatory diagrams illustrating how determination methods for the determination of whether dew condensation is to occur are switched in the first embodiment.
Figure 9B:
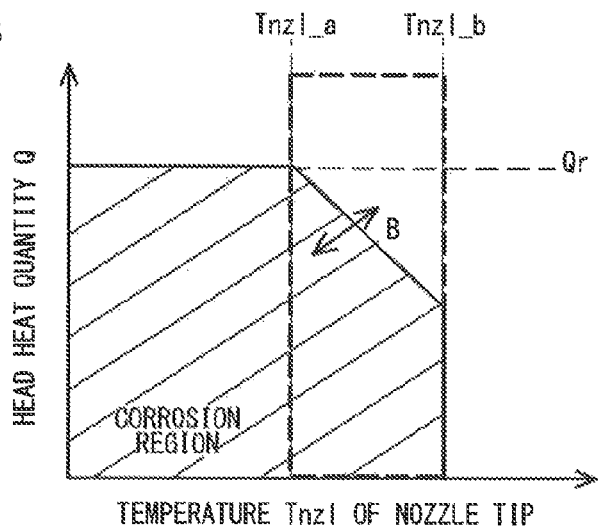
Figure 9C:
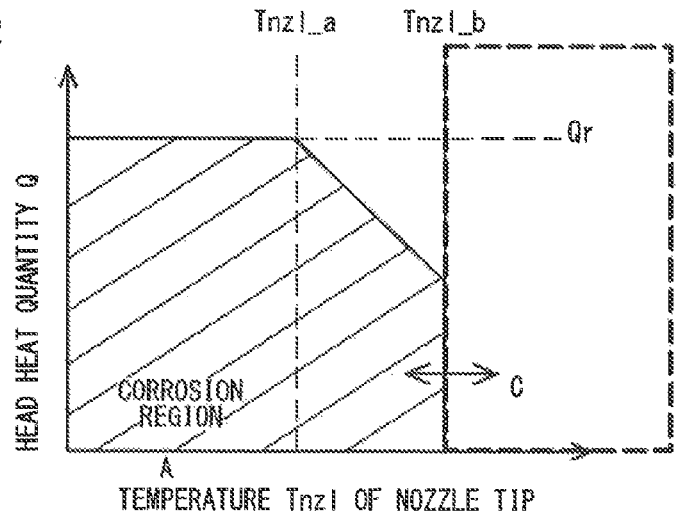

Thus, the internal combustion engine 100 of the present embodiment focuses on the temperature Tnzl of the nozzle tip and the head heat quantity Q to determine whether dew condensation is to occur on the tip portion of the nozzle 107$a$. Hereinafter, an example of the control of the internal combustion engine 100 by the ECU 111 will be described with reference to FIG. 4 through FIG. 9C. FIG. 4 is a flowchart illustrating the control of the internal combustion engine 100. FIG. 5 illustrates a map used to determine whether dew condensation is to occur in the first embodiment. FIG. 6 is a flowchart illustrating a control of calculating the head heat quantity Q in the starting of the internal combustion engine in the first embodiment. FIG. 7 is a graph illustrating a process of how the head heat quantity Q decreases from shutdown of the internal combustion engine till restart of the internal combustion engine. FIG. 8 is a graph illustrating a determination of whether corrosion is to occur that reflects on the head heat quantity Q in starting of the internal combustion engine. FIG. 9A, FIG. 9B, and FIG. 9C are explanatory diagrams illustrating how determination methods for determining whether dew condensation is to occur are switched in the first embodiment.

At step S1, the first detection unit 111a included in the ECU 111 carries out a calculation for estimating the temperature Tnzl of the nozzle tip. Here the temperature Tnzl of the nozzle tip is the temperature of the nozzle tip on a moment-to-moment basis, i.e., the instant temperature of the nozzle tip. The temperature Tnzl of the nozzle tip is calculated and estimated by, for example, the following equation 1.

$$Tnzl = f(NE \cdot IT \cdot TQ) - f(Tw \cdot Tf) \qquad (1)$$

NE: engine rotation speed IT: injection timing TQ: injection quantity Tw: water temperature Tf: fuel temperature Next, at step S2, it is determined whether the temperature Tnzl of the nozzle tip calculated at step S1 is equal to or less than a corrosion avoidable temperature Tnzl_b of the nozzle tip corresponding to a second threshold value. Here, with reference to FIG. 5, the description will be given of a determination method switching temperature Tnzl_a of the nozzle tip corresponding to a first threshold value and the corrosion avoidable temperature Tnzl_b of the nozzle tip corresponding to the second threshold value. The determination method switching temperature Tnzl_a of the nozzle tip defines a region A in which the effect of the head heat quantity Q on the occurrence of the corrosion of the injection aperture is large. Thus, when the temperature Tnzl of the nozzle tip is equal to or less than the determination method switching temperature Tnzl_a of the nozzle tip, only the head heat quantity Q, which greatly affects the occurrence of the corrosion of the injection aperture, is used to determine whether the injection aperture is to corrode.

On the other hand, the corrosion avoidable temperature Tnzl_b of the nozzle tip defines a region C in which the corrosion is to be avoided. That is to say, when the temperature Tnzl of the nozzle tip is equal to or greater than the corrosion avoidable temperature Tnzl_b of the nozzle tip, it is determined that the corrosion of the injection aperture is to be avoided even when the internal combustion engine 100 is stopped under the current condition. Thus, when the temperature Tnzl of the nozzle tip is equal to or greater than the corrosion avoidable temperature Tnzl_b of the nozzle tip, the determination of whether the injection aperture is to corrode is executed without using the head heat quantity Q.

With reference to FIG. 5, the second threshold value is greater than the first threshold value. A region B in which the temperature Tnzl of the nozzle tip is between the first threshold value and the second threshold value is a region including the boundary between the occurrence and the non-occurrence of the corrosion of the injection aperture. Thus, the first parameter and the second parameter are used for highly accurate injection aperture corrosion determination, i.e., the determination of whether the injection aperture is to corrode.

When the determination at step S2 is Yes, the process ends (END). That is to say, the temperature Tnzl of the nozzle tip belongs to the region C as illustrated in FIG. 9C, and it is determined that the corrosion of the injection aperture is to be avoided even when the internal combustion engine 100 is stopped under the current condition. When the temperature Tnzl of the nozzle tip is equal to or greater than the corrosion avoidable temperature Tnzl_b of the nozzle tip, and the temperature Tnzl of the nozzle tip is sufficiently high, the temperatures of parts other than the tip portion of the nozzle 107a reach the dew point before the temperature of the nozzle tip reaches the dew point even when the internal combustion engine 100 is stopped and the temperature of each part starts decreasing. Accordingly, dew condensation occurs on the part that has reached the dew point faster, and dew condensation on the tip portion of the nozzle 107a is avoided. This results in the avoidance of the corrosion of the injection aperture. When the temperature Tnzl of the nozzle tip belongs to the region C as described above, the determination of whether the injection aperture is to corrode is executed by using only the first parameter, and the calculation load is thus reduced.

On the other hand, when the determination at step S2 is No, the process moves to step S3. At step S3, a calculation for estimating the head heat quantity Q is executed. Here, the head heat quantity Q is calculated by integrating the instant temperatures Tnzl of the nozzle tip calculated at step S1 over a predetermined period τ. The head heat quantity Q is calculated and estimated by, for example, the following equation 2. The predetermined period τ is a period freely configured based on the adjustment condition.

$$Q = \Sigma Tnzl \qquad (2)$$

The use of the equation 2 allows to estimate the head heat quantity Q. However, the present embodiment further executes the following process to enhance the accuracy in the estimation of the head heat quantity Q. That is to say, based on a flowchart illustrated in FIG. 6, the head heat quantity Qstart in starting of the internal combustion engine is calculated, and reflected to the heat quantity accumulated after the starting of the internal combustion engine to be integrated thereafter to estimate more accurate head heat quantity Q. With reference to FIG. 6, at step S3a, a head heat quantity Qstop at the time of shutdown of the internal combustion engine is obtained. Here, the time of shutdown of the internal combustion engine corresponds to a time when the internal combustion engine was stopped last time. That is to say, the head heat quantity Q that was calculated and stored when the internal combustion engine was stopped last time is retrieved as the head heat quantity Qstop at the time of shutdown. At step S3b, an ambient temperature Tastop at the time of shutdown of the internal combustion engine is obtained. Here, the time of stop of the internal combustion engine also corresponds to the time when the internal combustion engine was stopped last time. The ambient temperature is obtained by the ambient temperature sensor 115. At step S3c, an internal combustion engine shutdown period t is obtained. That is to say, the elapsed time from the shutdown of the internal combustion engine last time till the starting of the internal combustion engine this time is obtained. At step S3d, an ambient temperature Tastart in the starting of the internal combustion engine this time is obtained. At step S3e, a heat release rate α of the heat released to the atmosphere is calculated. The heat release rate α increases as the ambient temperature decreases. The heat release rate α is calculated with use of both the ambient temperature Tastop at the time of shutdown of the internal combustion engine and the ambient temperature Tastart in the starting of the internal combustion engine. More specifically, the lower temperature of Tastop and Tastart is used to calculate the heat release rate α with use of the following equation 3.

$$\alpha = f(Tastop, Tastart) = k1 \times \min(Tastop, Tastart) \quad (3)$$

k1: coefficient

To reduce the computation load, it may be decided to use one of the ambient temperature Tastop at the time of shutdown of the internal combustion engine and the ambient temperature Tastart in the starting of the internal combustion engine in advance. More specifically, instead of the equation 3, the equation (4-1) or the equation (4-2) may be used to calculate the heat release rate α.

$$\alpha = k2 \times Tastop \quad (4\text{-}1)$$

k2: coefficient $$\alpha = k3 \times Tastart \quad (4\text{-}2)$$

k3: coefficient

At step S3$f$, a heat release quantity Qout during the internal combustion engine shutdown period t is calculated based on the internal combustion engine shutdown period t and the heat release rate α. The heat release quantity Qout during the internal combustion engine shutdown period t is represented as illustrated in FIG. 7. At step S3$g$, the head heat quantity Qstart in the starting of the internal combustion engine is calculated based on the head heat quantity Qstop at the time of shutdown of the internal combustion engine and the heat release quantity Qout during the internal combustion engine shutdown period.

The addition of the head heat quantity Q accumulated after the starting of the internal combustion engine to the head heat quantity Qstart in the starting of the internal combustion engine calculated as described above allows to obtain more accurate head heat quantity Q at the time. The above described process corrects the head heat quantity Q calculated by the equation 2 with use of the head heat quantity Q in the starting of the internal combustion engine. With reference to FIG. 8, the width of the temperature rise in the case where the head heat quantity Qstart in the starting is reflected is larger than that in the case where only the heat quantity estimated by the equation 2 is taken into account, i.e., the case where only the integration of the heat quantities after the starting is taken into account. For example, when the rotation speed and the load increase at time a and at time c, the heat quantity increases in both the case where only the heat quantity estimated by the equation 2 is taken into account and the case where the head heat quantity Qstart in the starting is taken into account. For example, when the determination of whether corrosion is to occur is executed at time b, it is determined that the injection aperture is to corrode in both cases. In contrast, when the determination of whether the injection aperture is to corrode is executed based on the head heat quantity Q calculated by the equation 2 at time d, the head heat quantity never exceeds the corrosion threshold value, and it is determined that the injection aperture is to corrode. This determination is an erroneous determination. On the other hand, when the head heat quantity Qstart in the starting is taken into account, it is determined that the temperature Tnzl of the nozzle tip is in the region in which the corrosion of the injection aperture is avoided. As described above, the consideration of the head heat quantity Qstart in the starting allows to execute more accurate determination of whether the injection aperture is to corrode. For example, when the internal combustion engine 100 is stopped and then restarted immediately and the cylinder head 101$a$ thus has a certain level of the head heat quantity Q, the determination of whether the injection aperture is to corrode is executed with high accuracy.

After the head heat quantity Q is estimated at step S3, at step S4, it is determined whether the temperature Tnzl of the nozzle tip is equal to or greater than the determination method switching temperature Tnzl_a of the nozzle tip corresponding to the first threshold value. When the determination at step S4 is No, the process moves to step S5. When the determination at step S4 is No, as illustrated in FIG. 9A, the temperature Tnzl of the nozzle tip belongs to the region A in which the head heat quantity Q greatly affects the occurrence of the corrosion of the injection aperture. At step S5, it is determined whether the head heat quantity Q is equal to or less than a threshold value Qr. The threshold value Qr is a heat quantity that allows the corrosion of the injection aperture to be avoided. When the head heat quantity Q is equal to or less than the threshold value Qr, it is determined that the injection aperture is to corrode. When the determination at step S5 is Yes, the process moves to step S7, and a determination of the corrosion of the injection aperture is made, i.e., it is determined that the injection aperture is to corrode, and a countermeasure against the corrosion of the injection aperture is executed. The determination of whether the injection aperture is to corrode at step S5 uses only the head heat quantity Q that is the second parameter. Thus, the computation load of the ECU 111 is reduced. When the temperature Tnzl of the nozzle tip belongs to the region A, the head heat quantity Q greatly affects the occurrence of the corrosion of the injection aperture. Thus, even when only the head heat quantity Q is used to determine whether the injection aperture is to corrode, the accuracy in the determination is ensured. The examples of the countermeasure against the corrosion of the injection aperture at step S7 include, but not limited to, the control of increasing the temperature of the internal combustion engine by reducing the EGR quantity, and the prohibition of shutdown of the internal combustion engine. As such countermeasures, conventionally known countermeasures may be employed as appropriate. When the determination at step S5 is No, the process ends (END).

On the other hand, when the determination at step S4 is Yes, the process moves to step S6. At step S6, it is determined whether the injection aperture is to corrode by using both the temperature Tnzl of the nozzle tip that is the first parameter and the head heat quantity Q that is the second parameter. When the determination at step S4 is Yes, as illustrated in FIG. 9B, the temperature Tnzl of the nozzle tip belongs to the region B near the boundary between the occurrence and the non-occurrence of the corrosion of the injection aperture. Thus, both the temperature Tnzl of the nozzle tip and the head heat quantity Q are used to determine whether the injection aperture is to corrode with high accuracy. More specifically, the following equations 5 and 6 are used to determine whether the injection aperture is to corrode. First, a decreasing rate v of the temperature Tnzl of the nozzle tip is calculated based on the temperature Tnzl of the nozzle tip estimated at step S1 and the head heat quantity Q estimated at step S3. The decreasing rate v is calculated by, for example, the following equation 5.

$$v = f(Tnzl \cdot Q) \quad (5)$$

Then, a dew point arrival time t0 is calculated based on the calculated decreasing rate v. The dew point arrival time t0 is calculated by, for example, the following equation 6.

$$t0 = f(Tnzl \cdot v) \tag{6}$$

After the dew point arrival time t0 is calculated by the equation 6, it is determined whether the dew point arrival time t0 is earlier than a predetermined threshold value a1. Here, the threshold value a1 is determined, by the adjustment of each actual machine, as a value used to determine whether dew condensation is to occur in the nozzle tip portion. When the dew point arrival time t0 is posterior to the threshold value a1, it is determined that the occurrence of dew condensation in the nozzle tip portion is to be avoided even when the internal combustion engine 100 is stopped at the time. The determination of whether the injection aperture is to corrode at step S6 uses both the temperature Tnzl of the nozzle tip that is the first parameter and the head heat quantity Q that is the second parameter, allowing for highly accurate determination. When the determination at step S6 is Yes, the process moves to step S7 as when the determination at step S5 is Yes, and the determination of the corrosion of the injection aperture is made, i.e., it is determined that the injection aperture is to corrode, and the countermeasure against the corrosion of the injection aperture is executed. On the other hand, when the determination at step S6 is No, the process ends (END).

As described above, the present embodiment maintains the accuracy in the determination of whether the injection aperture located in the nozzle tip portion is to corrode and reduces the computation load in the determination.

Second Embodiment

Next, a second embodiment will be described with reference to FIG. 10A, FIG. 10B, and FIG. 10C. The second embodiment replaces the method of determining whether dew condensation is to occur in the first embodiment with an alternative method. That is to say, the second embodiment changes the process at step S6 in the flowchart illustrated in FIG. 4.

Figure 10A:
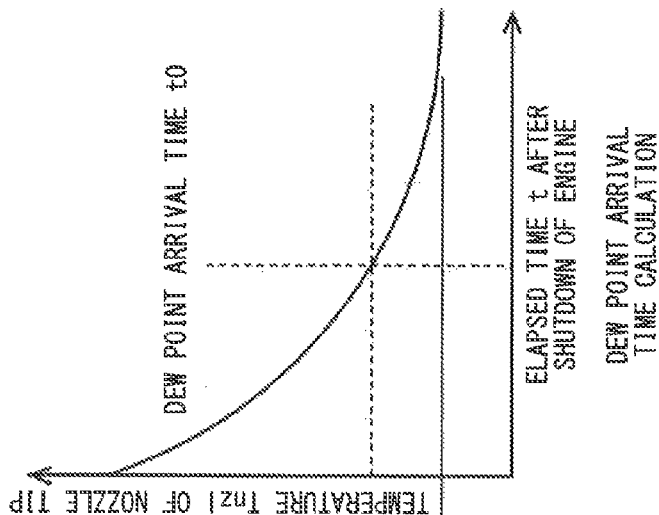
FIG. 10A, FIG. 10B, and FIG. 10C illustrate an alternative example for determining whether dew condensation is to occur.
Figure 10B:
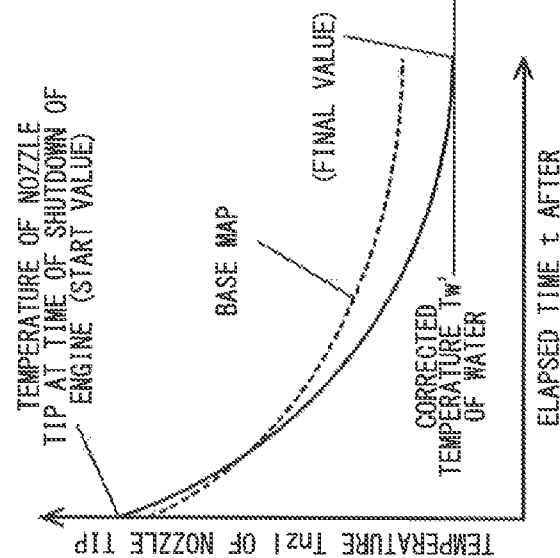
Figure 10C:
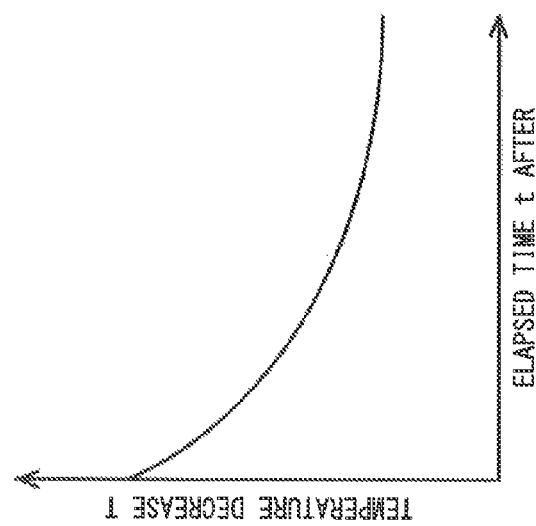

FIG. 10A, FIG. 10B, and FIG. 10C are diagrams for describing a method of determining whether dew condensation is to occur. FIG. 10A is a base map illustrating the decrease history of the temperature of the nozzle tip after shutdown of the internal combustion engine. FIG. 10B is a graph predicting a process of how the temperature of the nozzle tip changes with time by using the base map based on the temperature of cooling water converted from the head heat quantity. FIG. 10C illustrate a map used to calculate the dew point arrival time.

The ECU 111 includes a base map illustrated in FIG. 10A. The base map illustrates a relationship between an elapsed time t after shutdown of the engine and a temperature decrease T. Here, the temperature decrease T represents the amount of decrease in temperature at the time. That is to say, the temperature decrease T represents a process of how the temperature decreases. FIG. 10A reveals that the amount of decrease in temperature is large, i.e., the temperature decrease rate is fast immediately after shutdown of the engine, and the temperature decrease rate decreases as the time elapses after the shutdown of the engine. Such a base map is obtained from the adjustment condition of each engine. The temperature Tnzl of the nozzle tip is saturated to the temperature Tw of cooling water. In FIG. 10B, a corrected temperature Tw' of cooling water is set as a temperature to which the temperature Tnzl of the nozzle tip is saturated. More specifically, the corrected temperature Tw' of cooling water is set by reflecting the value obtained by converting the head heat quantity Q into the water temperature to the temperature Tw of cooling water. In the graph illustrated in FIG. 10B, the temperature Tnzl of the nozzle tip at the time of shutdown of the engine is set as an initial value, and Tw' to which the temperature Tnzl of the nozzle tip is saturated is set as a final value, and a process of how the temperature of the nozzle tip changes with time is predicted with use of the base map that represents the process of how the temperature decreases between the initial value and the final value. As illustrated in FIG. 10C, the dew point is applied to the graph illustrating the process of how the temperature of the nozzle tip changes with time, the time t0 at which the temperature of the nozzle tip reaches the dew point is calculated, and it is determined whether the dew point arrival time t0 obtained as described above is equal to or less than the threshold value a1. When the dew point arrival time t0 is posterior to the threshold value a1, it is determined that the occurrence of dew condensation in the nozzle tip portion is to be avoided even though the internal combustion engine 100 is stopped at the time. On the other hand, when the dew point arrival time t0 is earlier than the threshold value a1, it is determined that dew condensation is to occur and the corrosion is to occur. The ECU 111 may perform the above described determination.

Third Embodiment

Figure 11:
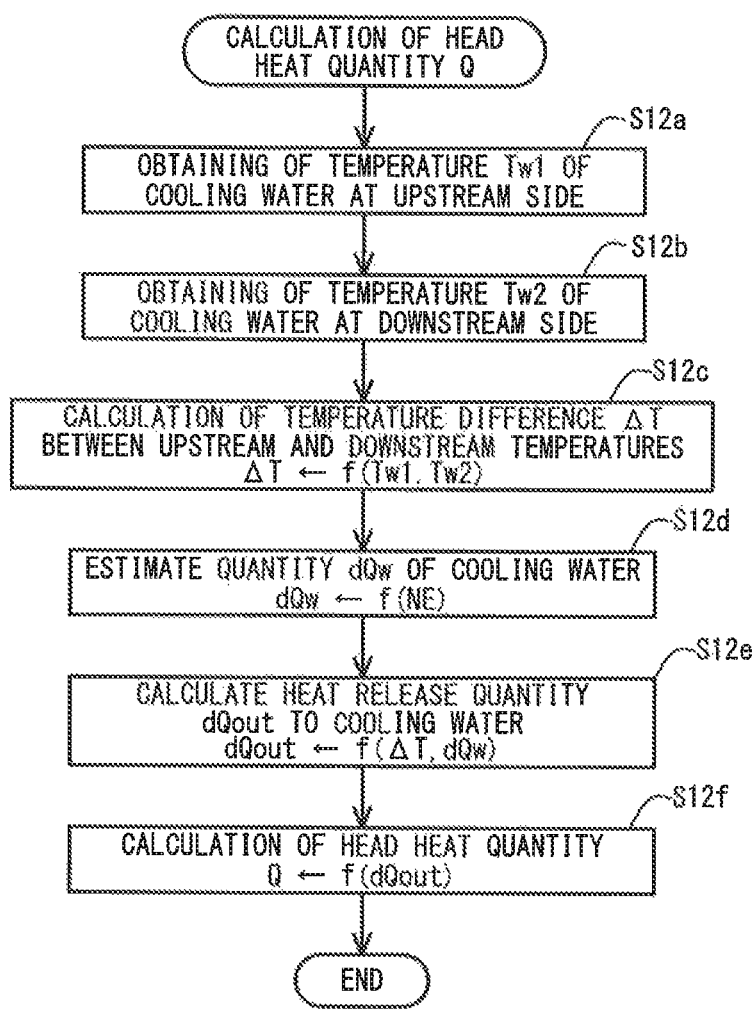
FIG. 11 is a flowchart illustrating a calculation method of the head heat quantity.

Next, the third embodiment will be described with reference to FIG. 11 through FIG. 13. The third embodiment replaces the estimation method of the head heat quantity Q in the first embodiment with an alternative method. That is to say, the process at step S3 in the flowchart illustrated in FIG. 4 is changed.

Figure 12:
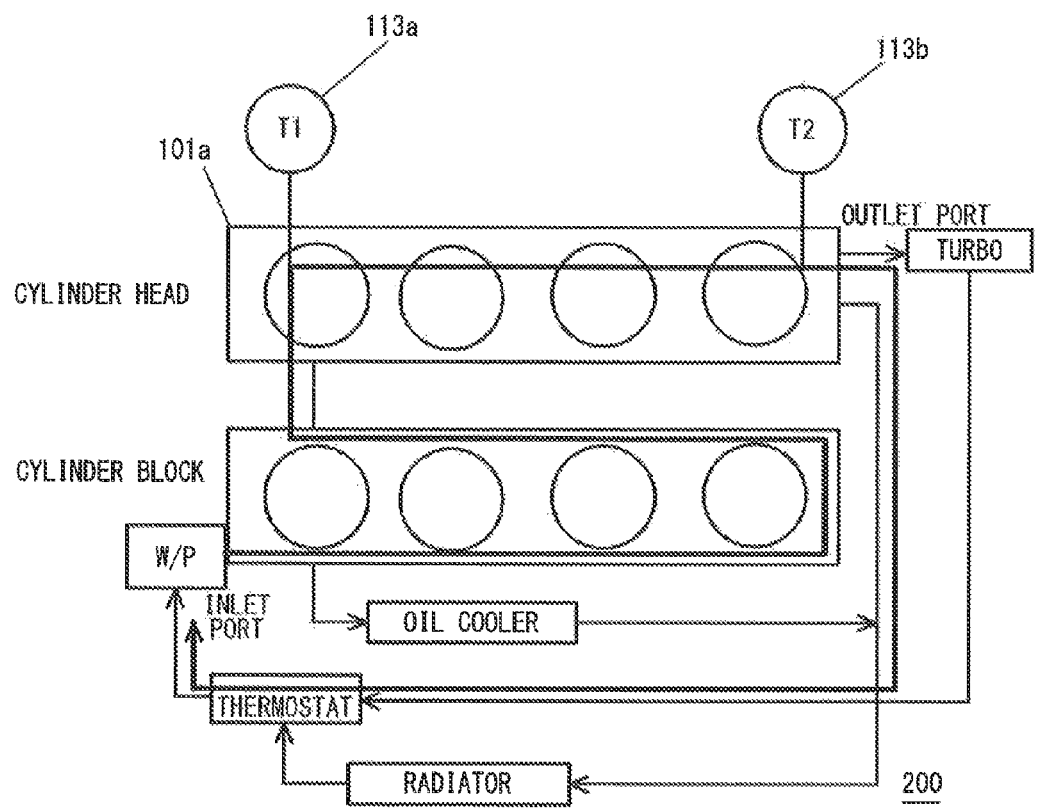
FIG. 12 is an explanatory diagram illustrating the arrangement of a first thermometer and a second thermometer.
Figure 13:
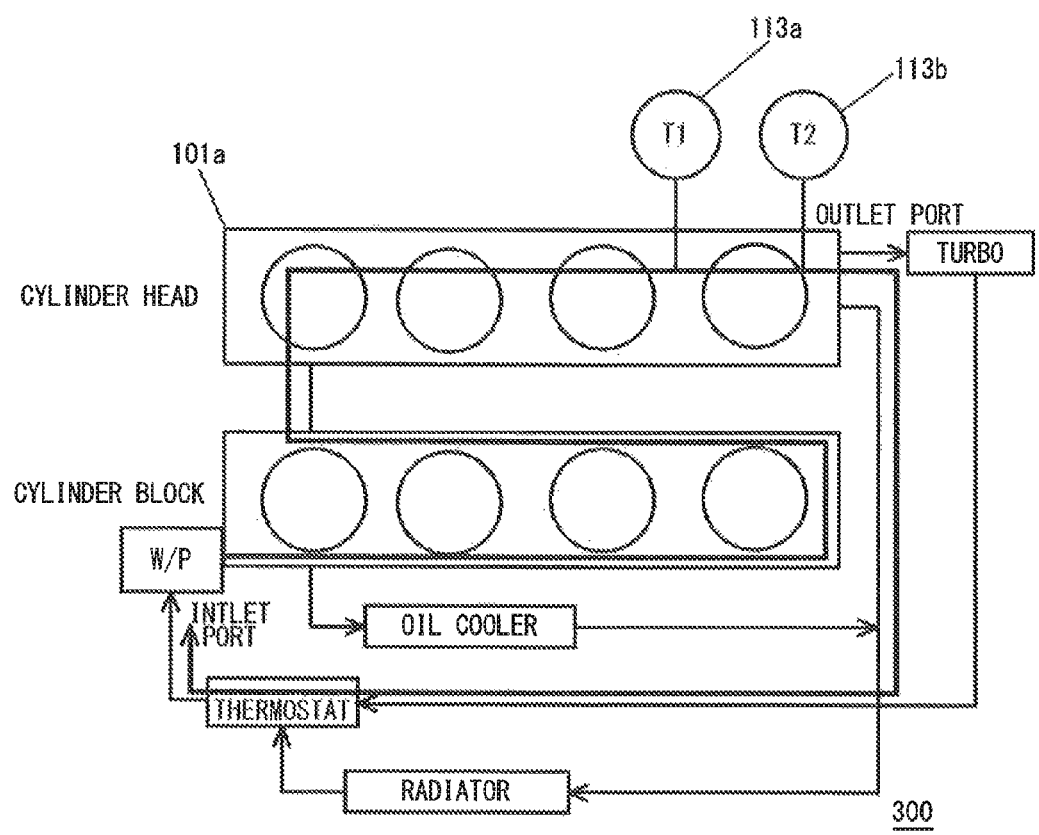
FIG. 13 is an explanatory diagram illustrating an alternative arrangement of the first thermometer and the second thermometer.

With reference to FIG. 12, an internal combustion engine 200 includes a first water temperature sensor 113a at the front end side of the cylinder head 101a, and a second water temperature sensor 113b at the rear end side. With reference to FIG. 11, at step S12a, a temperature Tw1 of cooling water at the upstream side is detected by the first water temperature sensor 113a. At step S12b, a temperature Tw2 of cooling water at the downstream side is detected by the second water temperature sensor 113b. At step S12c, a temperature difference ΔT between the upstream and downstream temperatures is calculated. In the example illustrated in FIG. 12, the temperature difference ΔT across four cylinders is calculated. At step S12d, a quantity dQw of cooling water passing through the region of which the temperature is measured is estimated. This is estimated based on the rotation speed of the internal combustion engine. The rotation speed of the internal combustion engine is obtained by the NE sensor 112. When an electric water pump is employed, the quantity dQw of cooling water is estimated based on a rotation speed NP of the electric water pump. Next, at step S12e, a heat release quantity dQout from the cylinder head 101a to cooling water is calculated based on the temperature difference ΔT and the quantity dQw of cooling water. More specifically, the heat release quantity dQout is calculated with use of the following equation 7.

$$Qout = \rho \cdot dQw \cdot cv \cdot \Delta T \tag{7}$$

ρ: density of cooling water cv: specific heat at constant volume of cooling water At step S12f, the head heat quantity Q is calculated based on the heat release quantity dQout. When the head heat quantity Q is small, the heat release quantity dQout to cooling water is small. This results in the decrease in the temperature difference ΔT. The above relationship can be used to estimate the head heat quantity Q.

As described above, the use of the measurement data allows the head heat quantity Q to be accurately calculated. As in an internal combustion engine 300 illustrated in FIG. 13, the first water temperature sensor 113*a* and the second water temperature sensor 113*b* may be arranged to sandwich a single cylinder to obtain the temperature difference ΔT.

Fourth Embodiment

Figure 14:
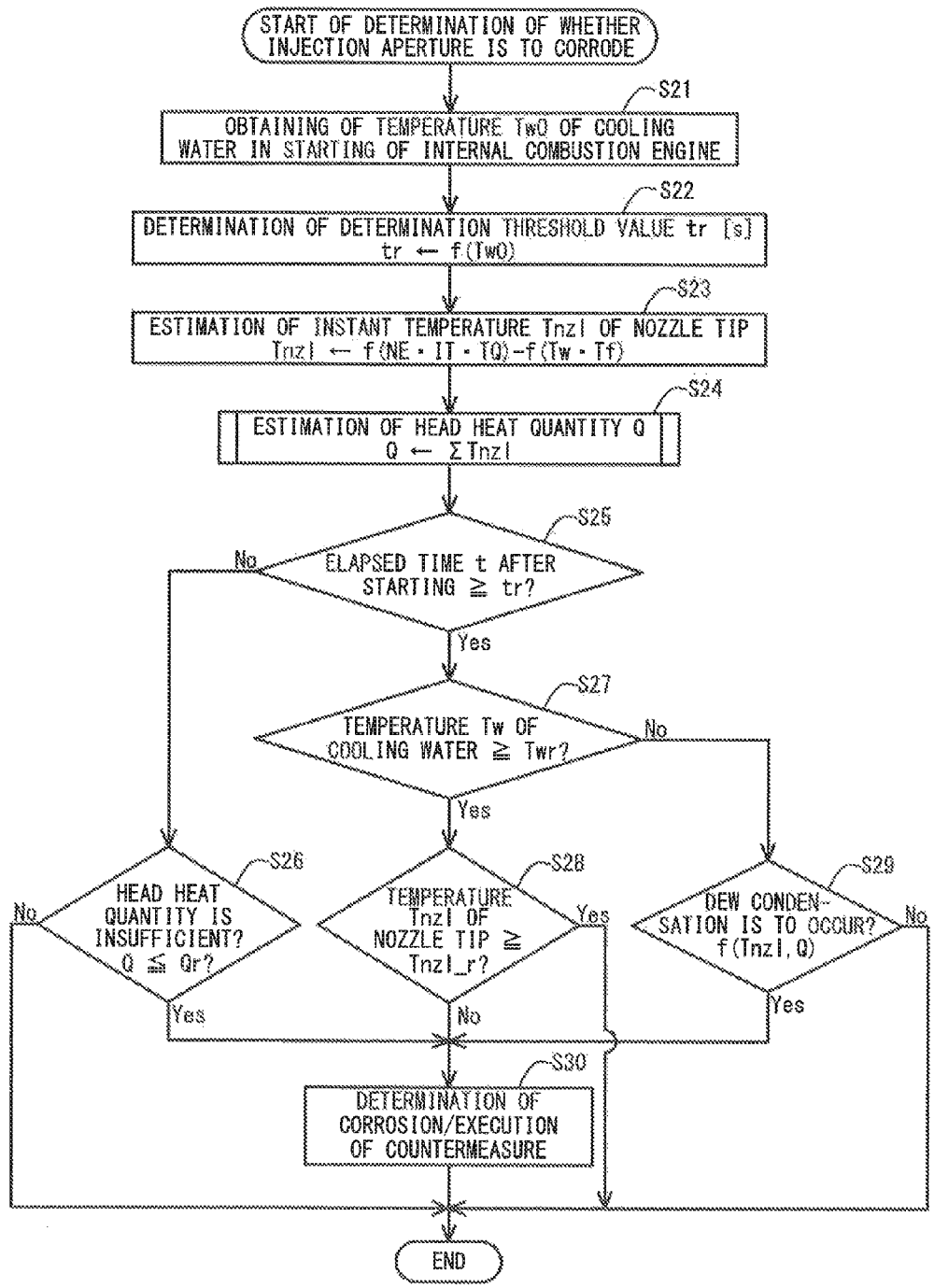
FIG. 14 is a flowchart used to determine whether the injection aperture is to corrode in a fourth embodiment.
Figure 15:
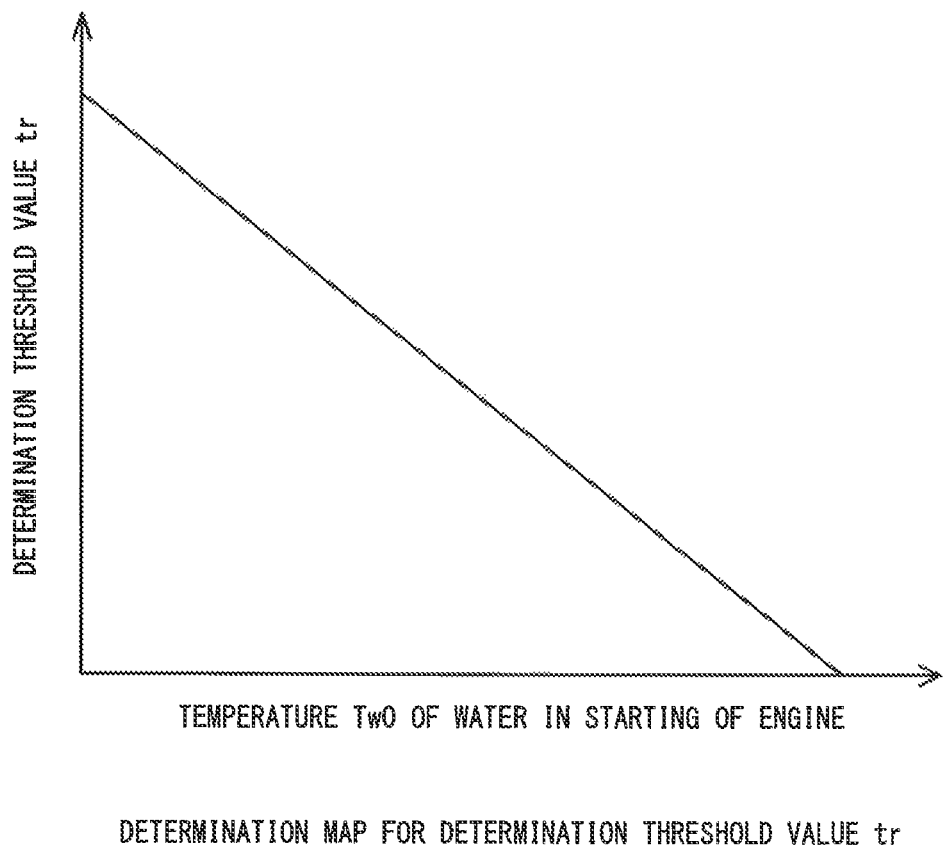
FIG. 15 illustrates a map used to determine a determination threshold value tr.
Figure 16:
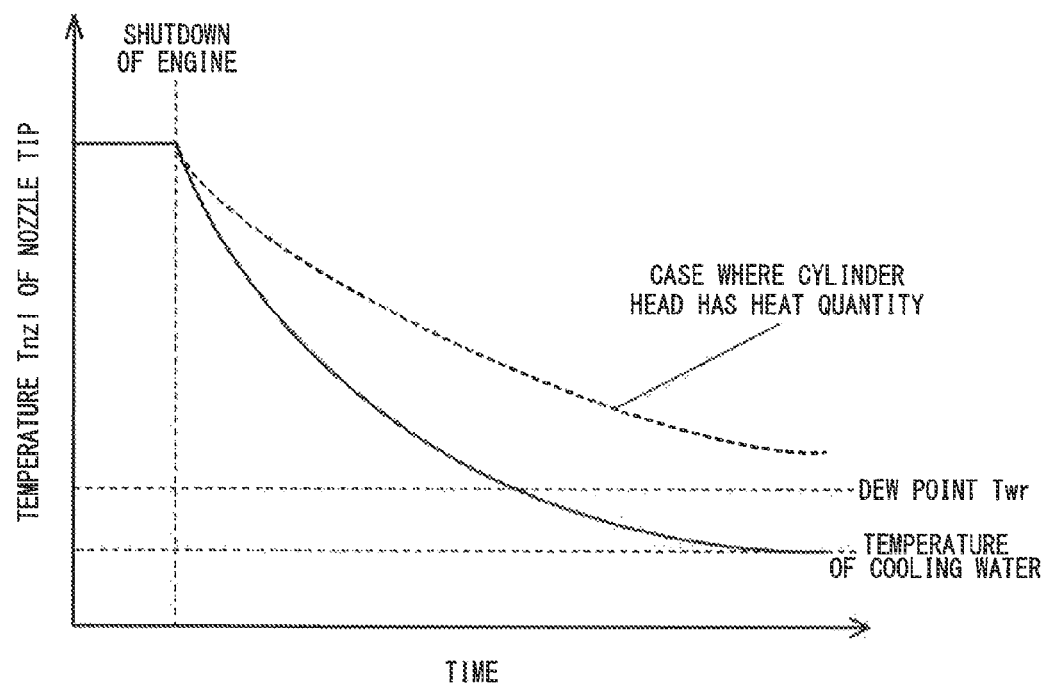
FIG. 16 is a graph illustrating a process of how the temperature of the nozzle tip decreases when the head has a heat quantity.
Figure 17A:
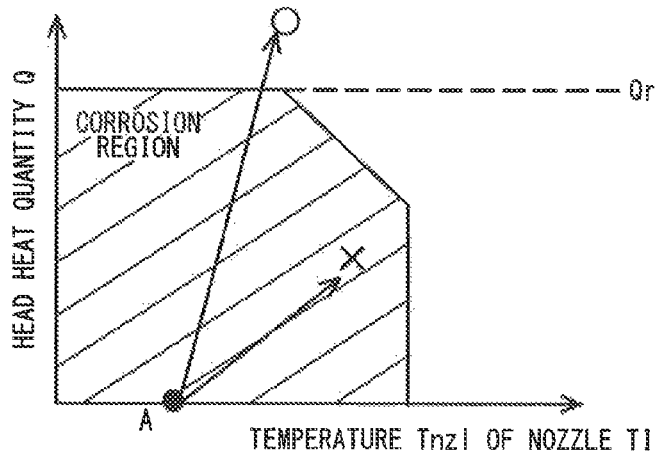
FIG. 17A, FIG. 17B, and FIG. 17C are explanatory diagrams illustrating how determination methods for determining whether dew condensation is to occur are switched in a fourth embodiment.
Figure 17B:
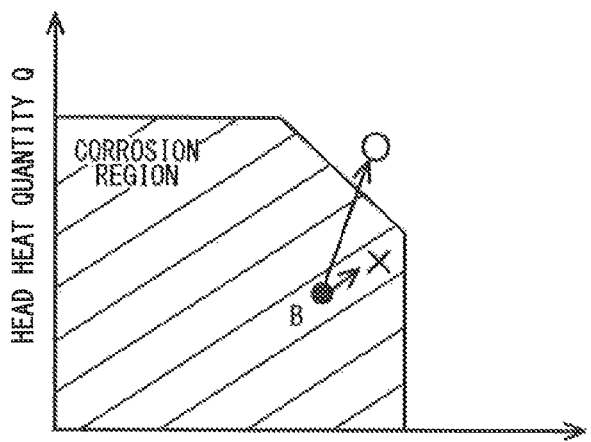
Figure 17C:
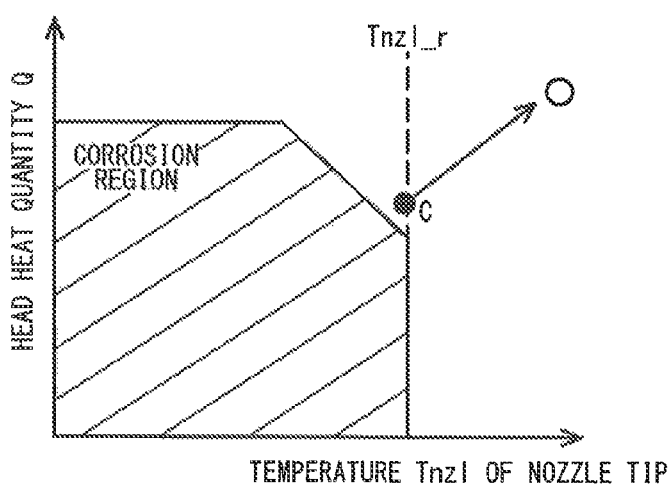

Next, a fourth embodiment will be described with reference to FIG. 14 through FIG. 17C. FIG. 14 is a flowchart used for the determination of whether the injection aperture is to corrode in the fourth embodiment. FIG. 15 illustrates a map used to determine a determination threshold value tr. FIG. 16 is a graph illustrating a process of how the temperature Tnzl of the nozzle tip decreases when the head has the heat quantity Q. FIGS. 17A, 17B, and 17C are explanatory diagrams describing how determination methods for determining whether dew condensation is to occur are switched in the fourth embodiment.

At step S21, a temperature Tw0 of cooling water in starting of the internal combustion engine is obtained. At step S22, the determination threshold value tr is obtained. The determination threshold value tr is obtained by referring to a map illustrated in FIG. 15. The determination threshold value tr corresponds to the first threshold value, and is determined by the temperature Tw0 of cooling water in the starting of the internal combustion engine corresponding to the evaluation value. The determination threshold value tr is a value taken into account to determine the region A in which the effect of the head heat quantity Q on the corrosion of the injection aperture is large. With reference to FIG. 15, the determination threshold value tr decreases as the temperature Tw0 of cooling water in starting of the internal combustion engine increases. That is to say, the determination threshold value tr becomes smaller. When the temperature Tw0 of cooling water is high, the temperature Tnzl of the nozzle tip is near the boundary between the occurrence and the non-occurrence of the corrosion of the injection aperture, and is near the region in which highly accurate determination of whether the injection aperture is to corrode is required. Thus, the determination threshold value tr is set low to ease the move to the region in which both the first parameter and the second parameter are used for the determination of whether the injection aperture is to corrode. In another aspect, when the temperature Tw0 of cooling water is low, the temperature Tnzl of the nozzle tip hardly affects the determination of whether the injection aperture is to corrode, and the effect of the head heat quantity Q on the determination of whether the injection aperture is to corrode is large. That is to say, when the head heat quantity Q is large even though the temperature Tw0 of cooling water is low and the temperature Tnzl of the nozzle tip, which changes in a correlation with the temperature Tw of cooling water, is low, the corrosion of the injection aperture is to be avoided. The map illustrated in FIG. 15 reflects the above described phenomena.

At step S23, the instant temperature Tnzl of the nozzle tip is obtained. This is calculated with use of the equation 1 in the first embodiment as in the first embodiment. At step S24, the calculation to obtain the head heat quantity Q is executed. The calculation of the head heat quantity Q is executed with the equation 2 as in the first embodiment. At this time, as in the first embodiment, the head heat quantity Qstart in the starting of the internal combustion engine may be additionally taken into account.

At step S25, it is determined whether the elapsed time t after the staring of the internal combustion engine 100 is equal to or greater than the determination threshold value tr. When the determination at step S25 is No, the process moves to step S26. At step S26, it is determined whether the head heat quantity Q is equal to or less than the threshold value Qr. When the determination at step S25 is No, as illustrated in FIG. 17A, the temperature Tnzl of the nozzle tip belongs to the region A in which the effect of the head heat quantity Q on the occurrence of the corrosion of the injection aperture is large. The threshold value Qr is a heat quantity that allows the corrosion of the injection aperture to be avoided. Thus, when the head heat quantity Q is equal to or less than the threshold value Qr, it is determined that the injection aperture is to corrode. When the determination at step S26 is Yes, the process moves to step S30, and the determination of the corrosion of the injection aperture is made, i.e., it is determined that the injection aperture is to corrode, and a countermeasure against the corrosion of the injection aperture is executed. The determination of whether the injection aperture is to corrode at step S26 uses only the head heat quantity Q that is the second parameter. Thus, the computation load on the ECU 111 is reduced. When the temperature Tnzl of the nozzle tip belongs to the region A, the effect of the head heat quantity Q on the occurrence of the corrosion of the injection aperture is large. Thus, the determination accuracy is ensured even though only the head heat quantity Q is used to determine whether the injection aperture is to corrode. The examples of the countermeasure against the corrosion of the injection aperture at step S30 include, but not limited to, the control of increasing the temperature of the internal combustion engine by reducing the EGR quantity, and the prohibition of shutdown of the internal combustion engine. The conventionally known countermeasures may be appropriately applied as such countermeasures. When the determination at step S26 is No, the process ends (END). This is the same as in the first embodiment.

When the determination at step S25 is Yes, the process moves to step S27. At step S27, it is determined whether the temperature Tw of cooling water is equal to or greater than a threshold value Twr. Here, the threshold value Twr is a value determined by referring to the adjustment condition or the like, and can be set to, for example, a dew point. The present embodiment sets the threshold value Twr to the dew point as an example. As illustrated in FIG. 16, the temperature Tnzl of the nozzle tip is saturated to the temperature Tw of cooling water. Therefore, the temperature Tnzl of the nozzle tip decreases to the temperature Tw of cooling water after shutdown of the internal combustion engine. When the head heat quantity Q stored in the cylinder head is taken into account, the temperature of cooling water is considered to be a temperature calculated by adding a proportionate heat quantity α to the measured temperature of cooling water, and the temperature Tnzl of the nozzle tip is to be saturated also to the temperature. Thus, when the temperature Tw of cooling water to which the head heat quantity Q is reflected and to which the temperature Tnzl of the nozzle tip is saturated is equal to or greater than the threshold value Twr, the temperature Tnzl of the nozzle tip never falls below the dew point, and it is determined that the corrosion of the injection aperture is to be avoided.

When the determination at step S27 is Yes, the process moves to step S28. At step S28, it is determined whether the temperature Tnzl of the nozzle tip is equal to or greater than the threshold value Tnzl_r. Here, the threshold value Tnzl_r is a value that allows to determine that the injection aperture is not to corrode when the temperature Tnzl of the nozzle tip is equal to or greater than the threshold value Tnzl_r. When the determination at step S28 is Yes, as illustrated in FIG. 17C, the temperature Tnzl of the nozzle tip belongs to the region C, and it is determined that the corrosion of the injection aperture is to be avoided even when the internal combustion engine 100 is stopped under this condition. As described above, when the temperature Tnzl of the nozzle tip belongs to the region C, the determination of whether the injection aperture is to corrode can be executed by using only the temperature Tnzl of the nozzle tip that is the first parameter. Thus, the computation load is reduced. On the other hand, when the determination at step S28 is No, the process moves to step S30, and the countermeasure against the corrosion of the injection aperture is taken.

On the other hand, when the determination at step S27 is No, the process moves to step S29. At step S29, it is determined whether the injection aperture is to corrode by using both the temperature Tnzl of the nozzle tip that is the first parameter and the head heat quantity Q that is the second parameter. When the determination at step S27 is No, as illustrated in FIG. 17B, the temperature Tnzl of the nozzle tip belongs to the region B near the boundary between the occurrence and the non-occurrence of the corrosion of the injection aperture. Thus, both the temperature Tnzl of the nozzle tip and the head heat quantity Q are used to determine whether the injection aperture is to corrode with high accuracy. The tangible calculation in accordance with the determination of whether the injection aperture is to corrode is common to that of the first embodiment, and thus the detailed description thereof is omitted. Steps common to those of the first embodiment are executed in both the cases where the determination at step S29 is Yes and No. Thus, the detailed description thereof is omitted.

As described above, the present embodiment maintains the accuracy in the determination of whether the injection aperture located in the nozzle tip portion is to corrode and reduces the computation load in the determination.

While the exemplary embodiments of the present invention have been illustrated in detail, the present invention is not limited to the above-mentioned embodiments, and other embodiments, variations and variations may be made without departing from the scope of the present invention.

[DESCRIPTION OF LETTERS OR NUMERALS]

| | | | |
|---|---|---|---|
| 1 | fuel injection device | 100 | internal combustion engine |
| 101 | engine body | 102 | intake manifold |
| 103 | exhaust manifold | 104 | intake pipe |
| 105 | exhaust pipe | 107 | injector |
| 111 | ECU (control device) | | |

The invention claimed is:

1. A control device for an internal combustion engine that includes:
a first detection unit that detects, as a first parameter, a temperature of a nozzle tip of an injector; and a second detection unit that detects, as a second parameter, a heat quantity of a cylinder head, and executes a dew condensation determination that determines whether dew condensation is to occur on the nozzle tip of the injector after shutdown of the internal combustion engine by using at least one of the first parameter and the second parameter, the control device comprising:
a third detection unit that detects an evaluation value that allows to evaluate a state of the internal combustion engine, a threshold value for selecting which parameter of the first parameter and the second parameter is selected being set with respect to the evaluation value,
wherein the control device switches a parameter to be used to the first parameter, to the second parameter, or to both the first parameter and the second parameter in accordance with the evaluation value when executing the dew condensation determination.

2. The control device for an internal combustion engine according to claim 1, wherein
the second parameter is used as the parameter to be used for the dew condensation determination when the evaluation value is equal to or less than a first threshold value.

3. The control device for an internal combustion engine according to claim 1,
wherein both the first parameter and the second parameter are used as the parameter to be used for the dew condensation determination when the evaluation value is between a first threshold value and a second threshold value greater than the first threshold value.

4. The control device for an internal combustion engine according to claim 1,
wherein the first parameter is used as the parameter to be used for the dew condensation determination when the evaluation value is equal to or greater than a second threshold value greater than a first threshold value.

5. The control device for an internal combustion engine according to claim 1,
wherein the evaluation value is the temperature of the nozzle tip of the injector.

6. The control device for an internal combustion engine according to claim 1,
wherein the evaluation value is a temperature of cooling water of the internal combustion engine.

7. The control device for an internal combustion engine according to claim 1,
wherein the second detection unit detects the heat quantity of the cylinder head as the second parameter by reflecting a heat quantity accumulated after starting of the internal combustion engine to a heat quantity of the cylinder head in the starting of the internal combustion engine.

* * * * *